United States Patent Office 3,795,688
Patented Mar. 5, 1974

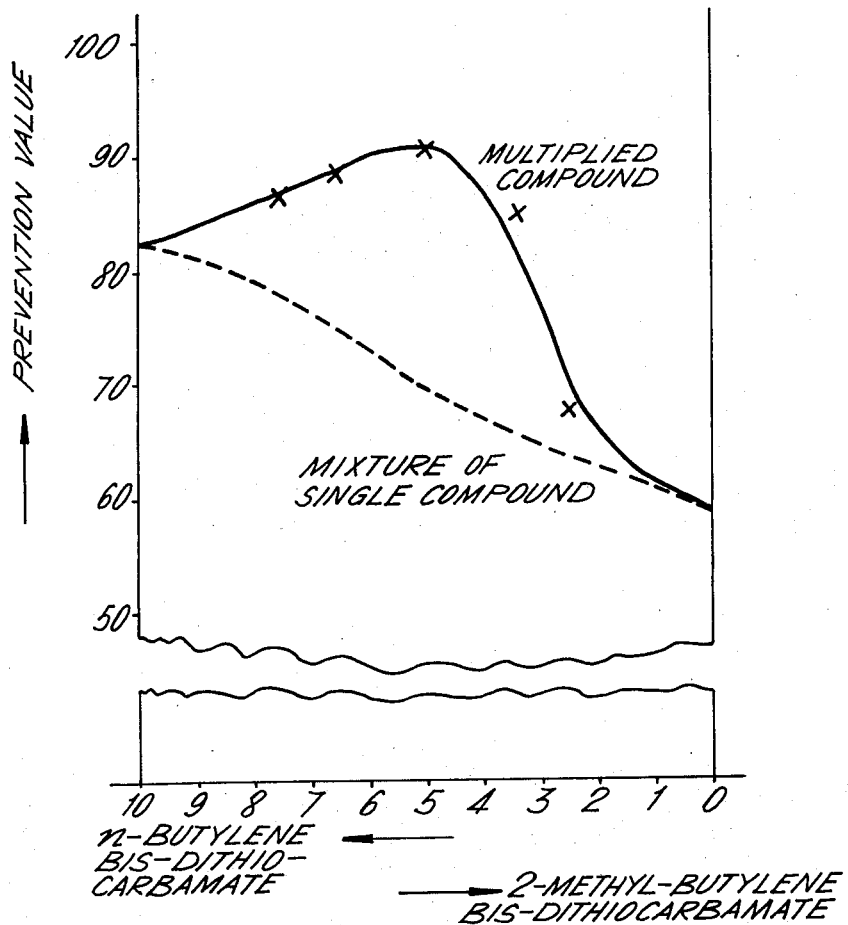

3,795,688
REACTION PRODUCTS OF ZINC SALTS WITH ALKYLENE BISDITHIOCARBAMATES
Keiji Aoyama, Rokuro Akahira, and Yuichi Katoh, Tokyo, Japan, assignors to Denki Kagaku Kogyo Kabushiki Kaisha and Kanesho Kabushiki Kaisha, both of Tokyo, Japan
Filed Apr. 13, 1971, Ser. No. 133,645
Claims priority, application Japan, Apr. 22, 1970, 45/34,536
Int. Cl. C07f 3/06
U.S. Cl. 260—429.9                     4 Claims

ABSTRACT OF THE DISCLOSURE

A zinc salt is reacted with a first alkylene bisdithiocarbamate having the formula $$\begin{array}{c} \text{S} \\ \| \\ \text{CH}_2\text{—NH—C—SM} \\ | \\ \text{CH—NH—C—SM} \\ | \quad\quad \| \\ \text{R} \quad\quad \text{S} \end{array}$$

and a second alkylene bisdithiocarbamate having the formula $$\begin{array}{c} \text{S} \\ \| \\ \text{CH}_2\text{—NH—C—SM} \\ | \\ \text{R}_1\text{—C—NH—C—SM} \\ | \quad\quad\quad \| \\ \text{R}_2 \quad\quad\quad \text{S} \end{array}$$

wherein R and $R_1$ are each independently selected from the group consisting of H and lower alkyl having 1 to 3 carbon atoms, $R_2$ is lower alkyl having 1 to 3 carbon atoms, and M is a monovalent base or metal. The first and second alkylene bisdithiocarbamates are present in respective molar ratios of 3:7–7:3. The resultant multiplied compound exhibits a synergistic fungicidal effect.

---

This invention relates to new fungicides for use in agriculture and horticulture. More particularly, it relates to fungicides containing as an active ingredient compounds having a molecular structure wherein two different alkylene bisdithiocarbamate radicals are linked, alternately or randomly, by zinc.

The new compounds of the present invention are prepared by reacting one alkylene bisdithiocarbamic acid and another different alkylene bisdithiocarbamic acid with a zinc salt. To be more specific, two water soluble alkylene bisdithiocarbamates, which have different alkylene side chains, are reacted with a soluble zinc salt, in water, and at room temperature, to form a multiplied compound.

The resulting new compounds of this invention thus obtained are hereinafter referred to as "multiplied" compounds.

Accordingly, this invention is concerned with fungicides for use in agriculture and horticulture, said fungicides containing as active ingredients co-precipitated or multiplied compounds obtained by reacting a mixture consisting of two water soluble alkylene bisdithiocarbamates which have different alkylene side chains, with a soluble zinc salt. Metal salts of alkylene bisdithiocarbamates produced by reacting a single soluble alkylene bisdithiocarbamate with a soluble divalent metal salt are described, for example, in U.S. Pat. No. 2,317,765 and British Pat. No. 1,088,516. Such patents, however, do not relate to multiplied compounds obtained by simultaneously reacting two alkylene bisdithiocarbamates, which have different alkylene side chains, with a divalent metal salt, nor do they relate to higher alkylene bisdithiocarbamate compounds other than propylene.

The present inventors have found, based on numerous fungicidal tests, that the multiplied compounds of the present invention have much greater fungicidal activity than previously known alkylene bisdithiocarbamates.

More specifically, this invention is directed to new fungicides for use in agriculture and horticulture characterized in that said fungicides contain as active ingredients new multiplied compounds of alkylene bisdithiocarbamic acid zinc salts prepared by reacting an aqueous mixed solution of two alkylene bisdithiocarbamates, A and B, in a molar ratio of 3:7–7:3, with a solution of soluble zinc salt. A is represented by the formula $$\begin{array}{c} \text{S} \\ \| \\ \text{CH}_2\text{—NH—C—SM} \\ | \\ \text{CH—NH—C—SM} \\ | \quad\quad \| \\ \text{R} \quad\quad \text{S} \end{array}$$

and B is represented by the formula $$\begin{array}{c} \text{S} \\ \| \\ \text{CH}_2\text{—NH—C—SM} \\ | \\ \text{R}_1\text{—C—NH—C—SM} \\ | \quad\quad\quad \| \\ \text{R}_2 \quad\quad\quad \text{S} \end{array}$$

In the above formulas of A and B, R and $R_1$ may be the same or different, and each stands for hydrogen or lower alkyl having 1 to 3 carbon atoms, $R_2$ is lower alkyl having 1 to 3 carbon atoms, and M is a salt formable monovalent base or metal.

Inorganic zinc salts herein described include: e.g. zinc sulfate, zinc acetate, zinc chloride and zinc nitrate.

According to the present invention, production of the multiplied compound is usually effected in an aqueous medium.

Other solvents such as methanol, ethanol, dioxane, dimethyl sulfoxide (DMSO), dimethyl formamide (DMF), tetrahydrofuran (THF) and hexamethylphosphoramide (HMPA) may be used. The reaction is advantageously effected at a temperature of 0°–50° C. In the preparation of the compounds of the present invention, a stabilizer, e.g. sodium phosphate, ammonium sulfate, sodium acetate, hexamethylenetetramine, or the like may be added.

The physical and chemical properties of multiplied compounds thus obtained indicate that they are not simply a mixture of single zinc salts of compounds of the Formulas A and B, but are instead compounds having a molecular configuration in which the different alkylene bisdithiocarbamate groups of Formulas A and B are bonded by zinc.

The activity of the multiplied compounds of the present invention as agricultural chemicals is described hereinafter.

Among the compounds represented by the formulae A and B, there are some which have fungicidal activity however they exhibit low residual efficacy. In contrast thereto, the co-precipitated compounds of this invention show both high fungicidal activity and high residual effect. Moreover, the compounds of this invention are especially effective in inhibiting spore germination. They may be effectively utilized even under virulent disease conditions. Furthermore, due to their high activity and residual effect, longer intervals can be permitted between applications. This is a great labor saver and it accounts for obvious economic advantages.

Formulations of the compound of the instant invention are prepared as follows: the active ingredients which are insoluble or sparingly soluble in water, are dried, pulverized and, if required, blended with inactive carriers. Suitable surfactants may be added to obtain wettable dusts or powders. Inactive carriers hereinbefore described include white carbon, mica, talc, pyrophyllite and clays.

Suitable surfactants include lignin sulfonate, polyoxyethylene alkylphenol ether, dodecyl benzenesulfonate and the like. If required, a stabilizer may be added to the formulation.

The following examples are intended to illustrate the production of the compounds of the present invention.

Example 1

A mixture of 0.1 mol of propylene-bisdithiocarbamic acid-sodium salt and 0.1 mol of isobutylene-bisdithiocarbamic acid-sodium salt was dissolved in 200 ml. of water. 0.2 mol of a 5% aqueous zinc sulfate solution was added dropwise thereto at room temperature and while stirring. The reaction mixture was further stirred for two hours. The resulting precipitate was filtered off, washed and dried. 35 g. of a fine, pale yellow powder were obtained. This product was analyzed by decomposition with acid. The results indicated a purity of 77.9% and a yield of 92.1%.

Example 2

A mixture of 0.1 mol of n-butylene-bisdithiocarbamic acid-sodium salt and 0.1 mol of isobutylene-bisdithiocarbamic acid-sodium salt was dissolved in 200 ml. of water. 0.2 mol of a 10% aqueous zinc sulfate solution was added dropwise thereto at room temperature and while stirring. The reaction mixture was further stirred for two hours. The resulting precipitate was filtered off, washed and dried. 34.2 g. of a fine pale yellow powder were obtained. Analytical results of this product upon decomposition with acid showed 77.5% purity and 87.5% yield.

It should be emphasized that the two examples described hereinbefore, are submitted only for the purpose of illustrating the present invention, and not for the purpose of limiting same.

The following Table 1, shows the fungicidal effect of wettable powders, containing as active ingredients the multiplied compounds of the present invention.

Formulation: (Hereafter, parts when recited are parts by weight.) 10 parts of white carbon as the inactive carrier, 57.4 parts of clay, 5.0 parts of calcium lignin sulfonate, and 2.0 parts of alkyl phenol oxide as the surfactants are added to 25.6 parts of the multiplied compound. The resultant mixture is thoroughly mixed and pulverized so as to prepare a 20% wettable powder.

Test Example 1: Slide germination method

Spores of alternaria leaf spot fungus (*Alternaria mali*) which had been cultivated for 14 days on a culture medium of apple green leaves were used. A mixed suspension of such spores, 0.2% cane sugar and the test compound (in varying concentrations) was dropped on a glass slide covered with celloidine film, and kept at a temperature of 26° C. for 15 hours. The number of spores was then counted.

The results are shown in the following Table II.

TABLE II
Percentage spore germination

| Composition | Conc. of active ingredient, p.p.m. | | |
|---|---|---|---|
|  | 100 | 10 | 1 |
| Multiplied compounds of this invention: |  |  |  |
| No. 1 of Table I | 0 | 0 | 100 |
|  | 0 | 23 | 100 |
| No. 2 of Table I | 0 | 15 | 98 |
|  | 0 | 20 | 100 |
| No. 3 of Table I | 0 | 97 | 100 |
|  | 0 | 94 | 100 |
| No. 4 of Table I | 0 | 52 | 100 |
|  | 0 | 60 | 100 |

TABLE 1.—COMPOSITIONS OF MULTIPLIED COMPOUNDS

| Test number | Alkylene part A | Alkylene part B | Reaction molar ratio, A:B | Purity, percent | Color |
|---|---|---|---|---|---|
| No. 1 | Propylene | Isobutylene | 5:5 | 77.9 | Pale yellow. |
|  | $\begin{array}{l}CH_2NH\overset{S}{\overset{\|}{C}}-S-\\ \overset{\|}{C}H-NH\overset{\|}{C}-S-\\ \overset{\|}{C}H_3 \quad \overset{\|}{S}\end{array}$ | $\begin{array}{l}CH_2NH\overset{S}{\overset{\|}{C}}-S-\\ CH_3-\overset{\|}{C}-NH\overset{\|}{C}-S-\\ \overset{\|}{C}H_3 \quad \overset{\|}{S}\end{array}$ |  |  |  |
| No. 2 | n-Butylene | Isobutylene | 5:5 | 77.5 | Pale yellow. |
|  | $\begin{array}{l}CH_2NH\overset{S}{\overset{\|}{C}}-S-\\ \overset{\|}{C}H-NH\overset{\|}{C}-S-\\ \overset{\|}{C}_2H_5 \quad \overset{\|}{S}\end{array}$ | $\begin{array}{l}CH_2NH\overset{S}{\overset{\|}{C}}-S-\\ CH_3-\overset{\|}{C}-NH\overset{\|}{C}-S-\\ \overset{\|}{C}H_3 \quad \overset{\|}{S}\end{array}$ |  |  |  |
| No. 3 | Propylene | 2-methylbutylene | 5:5 | 72.9 | Pale yellow. |
|  | $\begin{array}{l}CH_2-NH\overset{S}{\overset{\|}{C}}-S-\\ \overset{\|}{C}H-NH\overset{\|}{C}-S-\\ \overset{\|}{C}H_3 \quad \overset{\|}{S}\end{array}$ | $\begin{array}{l}CH_2NH\overset{S}{\overset{\|}{C}}-S-\\ CH_3-\overset{\|}{C}-NH\overset{\|}{C}-S-\\ \overset{\|}{C}_2H_5 \quad \overset{\|}{S}\end{array}$ |  |  |  |
| No. 4 | n-Butylene | 2-methylbutylene | 5:5 | 66.7 | Pale yellow. |
|  | $\begin{array}{l}CH_2-NH\overset{S}{\overset{\|}{C}}-S-\\ \overset{\|}{C}H-NH\overset{\|}{C}-S-\\ \overset{\|}{C}_2H_5 \quad \overset{\|}{S}\end{array}$ | $\begin{array}{l}CH_2NH\overset{S}{\overset{\|}{C}}-S-\\ CH_3-\overset{\|}{C}-NH\overset{\|}{C}-S-\\ \overset{\|}{C}_2H_5 \quad \overset{\|}{S}\end{array}$ |  |  |  |
| No. 5 | Ethylene | Propylene | 5:5 | 80.5 | Pale yellow. |
|  | $\begin{array}{l}CH_2NH-\overset{S}{\overset{\|}{C}}-S-\\ CH_2NH-\overset{\|}{C}-S-\\ \overset{\|}{S}\end{array}$ | $\begin{array}{l}CH_2NH-\overset{S}{\overset{\|}{C}}-S-\\ \overset{\|}{C}H-NH\overset{\|}{C}-S-\\ \overset{\|}{C}H_3 \quad \overset{\|}{S}\end{array}$ |  |  |  |

Note.—A and B are linked alternately or randomly by zinc.

TABLE II—Continued

| Composition | Conc. of active ingredient, p.p.m. | | |
|---|---|---|---|
| | 100 | 10 | 1 |
| Reference: | | | |
| Zinc isobutylene-bis-dithiocarbamate | 0 | 100 | |
| | 0 | 100 | |

$$CH_2-NH-\overset{S}{\underset{\|}{C}}-S$$
$$\qquad\qquad\qquad\diagdown$$
$$\qquad\qquad\qquad\qquad Zn$$
$$\qquad\qquad\qquad\diagup$$
$$CH_3-\underset{|}{C}-NH-\underset{\|}{C}-S$$
$$\quad\;\; CH_3 \qquad\quad S$$

20% (weight percent) wettable powder

| Zinc 2-methyl-butylene-bis-dithiocarbamate | 0 | 100 | |
| | 0 | 100 | |

$$CH_2-NH-\overset{S}{\underset{\|}{C}}-S$$
$$\qquad\qquad\qquad\diagdown$$
$$\qquad\qquad\qquad\qquad Zn$$
$$\qquad\qquad\qquad\diagup$$
$$CH_3-\underset{|}{CH}-NH-\underset{\|}{C}-S$$
$$\quad\;\; C_2H_5 \qquad\quad S$$

20% (weight percent)

| Zinc propylene-bis-dithiocarbamate | 0 | 100 | |
| | 0 | 100 | |

$$CH_2NH\overset{S}{\underset{\|}{C}}-S\diagdown$$
$$\qquad\qquad\qquad Zn$$
$$CHNHC-S\diagup$$
$$|\qquad\;\;\|$$
$$CH_3\;\;\; S$$

20% (weight percent)

| Zinc n-butylene-bis-dithiocarbamate | 0 | 100 | |
| | 0 | 100 | |

$$CH_2NH\overset{S}{\underset{\|}{C}}-S\diagdown$$
$$\qquad\qquad\qquad Zn$$
$$CHNHC-S\diagup$$
$$|\qquad\;\;\|$$
$$C_2H_5\;\; S$$

| A mixture of equal amounts of— | 0 | 100 | |
| | 0 | 100 | |

(mixture structure with CH₂NH·C(S)-S / CHNH·C(S)-S / CH₃ with Zn and CH₃-C(CH₃)-NHC(S)-S / CH₂NHC(S)-S with Zn)

20% (weight percent)

| A mixture of equal amounts of— | 10 | 100 | |
| | 12 | 100 | |

(mixture structure with CH₂NH-C(S)-S / CHNH-C(S)-S / C₂H₅ with Zn and CH₃-C(C₂H₅)-NH-C(S)-S / CH₂NH-C(S)-S with Zn)

20% (weight percent)

| Control | 100 | 100 | |

Test Example 2: Test for inhibition of the growth of disease germs by agar culture method A plate dilution agar culture with potato broth was employed. Petri dishes having a diameter of 9 cm. were used. Liquid suspensions in which the concentration of test agent was varied, were employed. The suspension was added dropwise by pipette, at 45–50° C., and allowed to homogenously disperse in and solidify with the culture medium.

Orange *Canker bacteris* (Xanthomonascitri) which had been cultivated for 3 days on an agar culture containing potato broth, alternaria leaf spot fungus (*Alternaria mali*) which had been similarly cultivated on agar culture, and orange black spot melanose fungus (*Diaporthe citri*) which had been cultivated for 28 days on orange green branch culture, were respectively used as the test disease organisms. Each hyphal was taken on a platinum spoon and was inoculated into the center of said agar culture, then kept at 25° C. for 72 hours. When the surface of controlled dishes was covered with inoculated germs, the area of growth in each of the dishes was measured and the degree of infection was observed.

The results are shown in the following Tables III and IV.

The degree of growth in each section was assigned a numerical value of from zero to five, with zero indicating no growth and five indicating vigorous growth in the controlled section.

TABLE III
Results by agar dilution culture method (percent)

| Composition | Canker, p.p.m. | | | Melanose, p.p.m. | | |
|---|---|---|---|---|---|---|
| | 100 | 10 | 1 | 100 | 10 | 1 |
| Compounds of this invention: | | | | | | |
| No. 1 of Table I | 0 | 2 | 5 | 0 | 2 | 5 |
| | 0 | 3 | 5 | 0 | 2 | 5 |
| No. 2 of Table I | 0 | 2 | 5 | 0 | 2 | 5 |
| | 0 | 3 | 5 | 0 | 2 | 5 |
| No. 3 of Table I | 0 | 3 | 5 | 0 | 2 | 5 |
| | 0 | 4 | 5 | 0 | 2 | 5 |
| No. 4 of Table I | 0 | 5 | --- | 0 | 2 | 5 |
| | 0 | 5 | --- | 0 | 2 | 5 |
| Zinc isobutylene-bis-dithiocarbamate | 4 | 5 | --- | 3 | 5 | --- |
| | 4 | 5 | --- | 4 | 5 | --- |
| Reference: | | | | | | |
| Zinc 2-methyl butylene-bis-dithiocarbamate | 5 | --- | --- | 4 | 5 | --- |
| | 5 | --- | --- | 4 | 5 | --- |
| Zinc propylene-bis-dithiocarbamate | 0 | 5 | --- | 1 | 5 | --- |
| | 0 | 5 | --- | 0 | 5 | --- |
| Zinc-n-butylene-bis-dithiocarbamate | 5 | --- | --- | 5 | --- | --- |
| | 5 | --- | --- | 5 | --- | --- |
| Zinc ethylene-bis-dithiocarbamate | 5 | --- | --- | 5 | --- | --- |
| | 5 | --- | --- | 5 | --- | --- |
| Control | 5 | 5 | 5 | 5 | 5 | 5 |

TEST EXAMPLE 3: Test for inhibition of germination and protection of intact plants using cucumber (*Sagami hanjiro*) downy mildew Cucumber leaves (*Sagami hanjiro*) exhibiting growth of down mildew (*Pseudo pernospora cubensis*) were placed in a greenhouse for 24 hours and allowed to form conidiospores. The conidiospores were mixed with a predetermined concentration of test agents and 0.1% cane sugar was added. The resultant spore suspension was dropped on a glass slide covered with celloidine film, and kept at 20° C. for 3 hours to permit the spores to germinate.

The testing of intact plants was carried out by planting one 30-day cucumber seedling (of the *Sagami hanjiro* variety) which was sown in a 6.6 cm. diameter pot, spraying the seedling with a solution of the test agent (the concentration of test agent being varied) then spraying it with the above-described spore suspension which suspension contains ten to fiifteen conidiospores (determined microscopically, magnification 150×). The pot was then kept in a greenhouse for 24 hours at 20° C. to initiate the disease.

Five days after the inoculation with downy mildew, the plants were inspected to determine the degree of outbreak of the disease.

The results were rated from zero to five. A rating of zero indicates the absence of disease. Five indicates a level of disease equivalent to that obtained with the control plant.

The degree of outbreak of the disease, in each plant, is described in Table IV using the above-described zero to five index.

In the same table, degree of growth is expressed by a scale from zero to one hundred percent.

On July 30th, the degree of infection with respect to five green leaves in one seedling was observed.

The degree of infection was calculated as follows:

Degree of infection
$$= \frac{(3 \times A) + (2 \times B) + (1 \times C) + (0 \times D)}{3 \times 50 \ (-\text{total number of leavese xamined})} \times 100$$

A is the number of leaves showing infection of more than 71% of leaf surface area.

TABLE IV.—SPORE GERMINATION INHIBITION AND INTACT PLANT TEST

| Composition | Degree of growth: spore germinating test, p.p.m. | | | | Degree of infection intact plant test, p.p.m. | | |
|---|---|---|---|---|---|---|---|
| | 6.4 | 3.2 | 1.6 | 0.8 | 100 | 20 | 5 |
| Multiplied compound of this invention: | | | | | | | |
| No. 1 of Table I | 0 | 10 | 48 | 98 | 0 | 0 | 0 |
| | 0 | 8 | 46 | 95 | 0 | 0 | 0 |
| No. 2 of Table I | 0 | 8 | 45 | 94 | 0 | 0 | 1 |
| | 0 | 8 | 45 | 90 | 0 | 0 | 0 |
| No. 3 of Table I | 0 | 22 | 69 | 100 | 0 | 1 | 2 |
| | 0 | 19 | 72 | 100 | 0 | 0 | 1 |
| No. 4 of Table I | 0 | 0 | 28 | 95 | 0 | 0 | 2 |
| | 0 | 5 | 32 | 100 | 0 | 0 | 1 |
| No. 5 of Table I | 0 | 8 | 68 | 97 | 0 | 1 | 1 |
| | 0 | 12 | 57 | 100 | 0 | 0 | 1 |
| Reference: | | | | | | | |
| Zinc isobutylene-bis-dithiocarbamate 20% (weight percent) | 25 | 42 | 93 | 100 | 2 | 4 | 5 |
| | 26 | 44 | 100 | | 1 | 4 | 5 |
| Zinc 2-methyl-butylene-bis-dithiocarbamate 20% (weight percent) | 41 | 48 | 95 | 100 | 3 | 5 | |
| | 40 | 51 | 100 | | 2 | 4 | 5 |
| Zinc-n-butylene-bis-dithiocarbamate 20% (weight percent) | 8 | 45 | 96 | 100 | 1 | 4 | 3 |
| | 0 | 44 | 97 | 100 | 1 | 3 | 5 |
| Zinc propylene-bis-dithiocarbamate 20% (weight percent) | 0 | 42 | 86 | 98 | 0 | 1 | 4 |
| | 0 | 28 | 80 | 95 | 0 | 1 | 5 |
| A mixture at an equal quantity of zinc propylene-bis-dithiocarbamate, zinc isobutylene-bis-dithiocarbamate 20% (weight percent). | 20 | 49 | 100 | | 2 | 4 | 5 |
| | 15 | 46 | 100 | | 3 | 5 | |
| Zinc ethylene-bis-dithiocarbamate 20% (weight percent) | 98 | 100 | | | 4 | 5 | |
| | 100 | | | | 4 | 5 | |
| Control | 100 | 100 | 100 | 100 | 5 | 5 | 5 |

TEST EXAMPLE 4: Field test

Cucumber seedlings (Tokiwa species) were planted in a field on May 13th. Three replicates (consecutive system) of ten seedlings per one section (plot) of four square meters was taken.

The test plants began to show infection by downy mildew and Anthranose (*Colletatrichum lagenarium*) by June 10th. A substantial percentage of the test plants was diseased by the end of June. The test chemicals were diluted to 1000 p.p.m. with a polyoxyethylene alkylphenol ether solution and sprayed a total of four times (July 4th, 9th, 15th and 20th) on the diseased plants.

In each of the first, second and third sprayings 23 liters per 100 square meters of the test chemicals were sprayed. In the last spraying, viz., July 20th, 25 liters per 100 square meters were sprayed.

B is the number of leaves showing infection of from 31% to 70% of leaf surface area.

C is the number of leaves showing infection of from 1% to 30% of leaf surface area.

D is the number of leaves showing no infection of leaf surface area.

These results are described in Table V below.

TABLE V
Disease infection (percent) of leaves and degree of infection

| Name or No. of composition | Conc. treated, p.p.m. | Downy mildew | | | Anthranose | | | Phyto-toxicity |
|---|---|---|---|---|---|---|---|---|
| | | P | Q | R | P | Q | R | |
| Multiplied compound of this invention: | | | | | | | | |
| No. 1 of Table I | 1,000 | 32.9 | 13.3 | 51.5 | 25.7 | 8.5 | 16.4 | |
| No. 2 of Table I | 1,000 | 32.0 | 12.2 | 47.2 | 19.3 | 6.7 | 12.9 | |
| No. 5 of Table I | 1,000 | 36.5 | 16.8 | 65.1 | 34.0 | 10.8 | 20.9 | |
| Reference: | | | | | | | | |
| Zinc ethylene-bis-dithiocarbamate marketed product Zine 65% | 1,300 | 43.9 | 18.8 | 72.8 | 44.7 | 15.6 | 30.2 | |
| Orthocide, 80% marketed product | 1,000 | 47.3 | 20.4 | 79.0 | 64.9 | 18.5 | 35.8 | |
| Control | | 80.3 | 25.8 | 100 | 96.0 | 51.6 | 100 | |

NOTE.—P=Disease infection (%) of leaves; Q=Degree of disease infection; R=Ratio to control.

The following example shows that the multiplied compounds of this invention exhiibt substantially greater fungicidal effects as compared to a simple mixture of two kinds of alkylene-bis-dithiocarbamates. Thus the multiplied compounds of the present invention exhibit synergistic effects.

These results are shown in Table VI. The figure attached herewith is a line graph, plotted in accordance with the results of Table VI, showing the relation between molar ratio and prevention value of the co-precipitated or multiplied compounds obtained from n-butylene-bis-dithiocarbamate and 2-methyl-butylene-bis-dithiocarbamate.

In Table VI: Prevention value=100—germination (percent).

TABLE I
Spore germination results

| | Components of raw materials | | | Percent germination | | Prevention value | |
|---|---|---|---|---|---|---|---|
| | n-Butylene-bis-dithio-carbamate: 2-methyl butylene-bis-dithio-carbamate (molar ratio) | Metal | Composition of agent | Concentration of test agent | | | |
| | | | | 50 p.p.m. | 10 p.p.m. | 50 p.p.m. | 10 p.p.m. |
| Multiplied compounds of this invention | 1:4 | Zn | Multiplied compound. | 32 | 95 | 68 | 5 |
| | 1:2 | Zn | ...do... | 16 | 70 | 84 | 30 |
| | 1:1 | Zn | ...do... | 10 | 52 | 90 | 48 |
| | 2:1 | Zn | ...do... | 12 | 53 | 88 | 47 |
| | 4:1 | Zn | ...do... | 14 | 89 | 86 | 11 |
| | 0:1 | Zn | Single | 42 | 100 | 58 | 0 |
| | 1:0 | Zn | ...do... | 18 | 100 | 82 | 0 |
| Reference | 1:1 | Zn | Simple mixture. | 30 | 100 | 70 | 0 |
| | 2:1 | Zn | ...do... | 28 | 100 | 72 | 0 |
| | 4:1 | Zn | ...do... | 20 | 100 | 80 | 0 |
| | 1:2 | Zn | ...do... | 38 | 100 | 62 | 0 |

Test method: 0.2% of cane sugar solution was charged into a petri dish, and a spore solution of *Altanaria mali* was added thereto. Varying concentrations of the test materials were added thereto. The inoculated petri dishes were then kept for 16 hours at 26° C. The number of spores was then counted under a microscope.

What we claim is:

1. An agricultural and horiticultural fungicide comprising a reaction product of zinc salt with a first alkylene bisdithiocarbamate having the formula

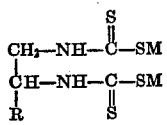

and a second alkylene bisdithiocarbamate having the formula

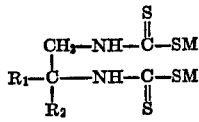

wherein R and $R_1$ are each independently selected from the group consisting of hydrogen and a lower alkyl having 1–3 carbon atoms, $R_2$ is a lower alkyl having 1–3 carbon atoms and M is a monovalent base or metal, which is capable of forming a salt, the first and second alkylene bisdithiocarbamates being present in a respective molar ratio of 3:7–7:3.

2. A process for preparing an agricultural and horticultural fungicide comprising a first step of dissolving into a solvent a first alkylene bisdithiocarbamate having the formula

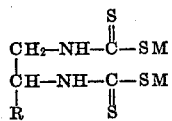

and a second alkylene bisdithiocarbamate having the formula

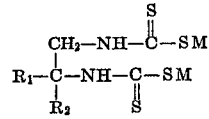

wherein R and $R_1$ are each independently selected from the group consisting of hydrogen and a lower alkyl having 1–3 carbon atoms, $R_2$ is lower alkyl having 1–3 carbon atoms and M is a monovalent base or metal which is capable of forming a salt, the first and second alkylene bisdithiocarbamates being present in a respective molar ratio of 3:7–7:3, a second step of adding a soluble zinc salt dropwise to the solution obtained in the first step while stirring and the third step of further stirring the solution to thereby react the zinc salt with the first and second alkylene bisdithiocarbamates.

3. The process according to claim 2 wherein said soluble zinc salt is zinc sulfate, zinc chloride, zinc nitrate, or zinc acetate.

4. The process according to claim 2 wherein said solvent is a water miscible solvent.

References Cited

UNITED STATES PATENTS

| | | | |
|---|---|---|---|
| 3,082,229 | 3/1963 | Nash | 260—429 |
| 3,259,643 | 7/1966 | Nash | 260—429 |
| 3,210,394 | 10/1965 | Nemec et al. | 260—429 |
| 3,294,829 | 12/1966 | Lehmann et al. | 260—429.9 |
| 3,326,951 | 6/1967 | Lehmann et al. | 260—429.9 X |
| 3,412,117 | 11/1968 | Gagliardini | 260—429.9 X |
| 3,178,336 | 4/1965 | Mugno | 260—429.9 X |

FOREIGN PATENTS

| | | | |
|---|---|---|---|
| 1,174,844 | 12/1969 | Great Britain | 260—429 K |

HELEN M. S. SNEED, Primary Examiner

U.S. Cl. X.R.

424—286